3,658,775
ALTERNATE COPOLYMER OF BUTADIENE AND ACRYLONITRILE AND A PROCESS FOR PREPARATION THEREOF
Akihiro Kawasaki, Masanobu Taniguchi, and Tsuneto Nishiyama, Chiba-ken, Japan, assignors to Maruzen Petrochemical Co., Tokyo, Japan
Filed June 26, 1969, Ser. No. 836,736
Int. Cl. C08d 1/14, 3/02
U.S. Cl. 260—82.5                9 Claims

ABSTRACT OF THE DISCLOSURE

Alternate copolymer of butadiene and acrylonitrile which is a novel product and a process for preparation therof which comprises contacting a mixture of butadiene and acrylonitrile in liquid phase with the catalyst system formed by mixing vanadium (V) oxychloride or chromium (VI) oxychloride with a trialkylaluminum compound.

BACKGROUND OF THE INVENTION

Field of the invention

Figure 1:
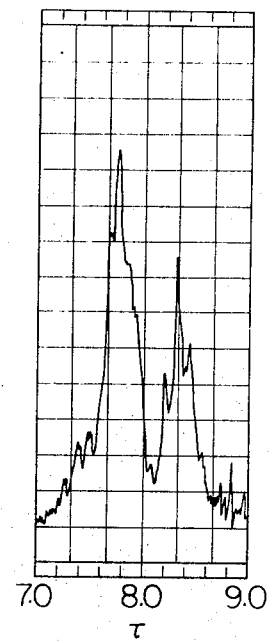

This invention relates to a new process of copolymerizing butadiene and acrylonitrile and more particularly to a process of preparing a new alternate copolymer of butadiene and acrylonitrile which shows high elasticity and the novel product thus obtained. The alternate copolymer of this invention is useful in the field of the polymer, rubber, plastics industries, etc. and is easily soluble in some organic solvent. It shows higher rubber-like elasticity than the corresponding random copolymer. Its glass transition temperature is lower than that of the conventional copolymer.

Description of the prior art

As far as the inventors know, there is no prior art in connection with the alternate copolymer of butadiene and acrylonitrile and the process for preparation thereof.

DESCRIPTION OF THE INVENTION

In accordance with this invention, it has been discovered that by using a catalyst system formed by mixing vanadium (V) oxychloride or chromium (VI) oxychloride with a trialkylaluminum compound within a given molar ratio, acrylonitrile can be copolymerized with butadiene to produce a new and high molecular weight copolymer.

The composition of the copolymer according to elementary analysis substantially agrees with the calculated value for a 1:1 copolymer of butadiene and acrylonitrile. The copolymerization reaction gave 1:1 copolymer over a wide range of initial monomer composition and also independently of polymerization time. The microstructure of the butadiene unit in the copolymer was all trans-configuration. The NMR spectrum of the copolymer was shown to be very different from that of the conventional ultra high nitrile (acrylonitrile content 48 mole percent) random copolymer of butadiene and acrylonitrile prepared by the prior art. Two strong peaks were observed at 7.71τ and 7.89τ in the NMR spectrum of the conventional ultra high nitrile random copolymer. On the other hand in the NMR spectrum of the copolymer in this invention only one strong peak appeared at 7.71τ in this region. This means that block sequence of butadiene-butadiene is not substantially included. Consequently, each fact mentioned above supports the assumption that the present copolymer should be an alternate copolymer of butadiene and acrylonitrile.

The alternate copolymer is easily soluble in chloroform, acetone and dimethylformamide at room temperature. This new alternate copolymer has many advantageous properties. For example, it shows higher rubbery elasticity than the conventional ultra high nitrile (acrylonitrile content 48 mole percent) random copolymer and its glass transition temperature is lower than that of the conventional copolymer. The microstructure of the butadiene unit in the conventional ultra high nitrile random copolymer is substantially composed of trans- and 1,2-configurations. On the other hand, as described above the microstructure of the butadiene unit in this alternate copolymer is all trans-configuration.

The trialkylaluminum compounds which form one component of the catalyst of this invention may be defined by the formula $AlR_1R_2R_3$ wherein $R_1$, $R_2$ and $R_3$ are alkyl radicals having from 1 to 12 carbon atoms. The preferred trialkylaluminum compounds, such as triethylaluminum or triisobutylaluminum, are readily available through normal commercial channels. Vanadium (V) oxychloride and chromium (VI) oxychloride are utilized in the purified form. The catalyst is simply prepared by mixing the two components in a hydrocarbon or a chlorinated hydrocarbon diluent or in a mixture of them under air-free condition at low temperature. The quantity of the two components may be varied over a wide range. In the preferred embodiment the molar ratio of a trialkylaluminum compound to vanadium (V) oxychloride should be lower than 1.5

$$\left(\frac{AlR_1R_2R_3}{VOCl_3} < 1.5\right)$$

In the preferred embodiment the molar ratio of trialkylaluminum compound to chromium (VI) oxychloride should also be lower than 1.5

$$\left(\frac{AlR_1R_2R_3}{Cr O_2Cl_2} < 1.5\right)$$

Hydrocarbons, such as heptane, octane, isooctane, benzene, toluene, etc.; chlorinated hydrocarbons, such as methylene chloride, ethylene chloride, tetrachloroethane, tetrachloroethylene, ethylchloride, trichloroethylene, trichloroethane, etc.; or a mixture of such diluents are used as diluent in preparing the catalyst. The diluent should be pretreated to remove harmful impurities which may be often contained therein. The presence of moisture, sulphur, sulphur-containing compounds and oxygen would act as harmful impurities. In actual practice, it is preferred that such impurities should not be present either in the diluent or in the monomer which is to be copolymerized.

The preparation of the new alternate copolymer of butadiene and acrylonitrile is carried out by contacting a mixture of the monomers in liquid phase with the catalyst system described above. The copolymerization reaction is generally carried out in the presence of a liquid organic diluent. Suitable diluents that can be used for the copolymerization are hydrocarbons, such as heptane, octane, isooctane, benzene, toluene, etc.; chlorinated hydrocarbons, such as methylene chloride, ethylene chloride, tetrachloroethane, tetrachloroethylene, ethylchloride, trichloroethylene trichloroethane, etc.; or a mixture of such diluents. The diluent should also be pretreated to remove harmful impurities which may be contained therein.

The temperature of the copolymerization process can be varied over a wide range, generally from −100° C. to +60° C. and preferably from −78° C. to +40° C. Sufficient pressure is employed to keep the monomers in liquid condition regardless of whether a diluent is present in the reaction mixture or not.

In general, the molar ratio of butadiene to acrylonitrile in the initial monomer composition will be from 20:80 to 80:20 and more usually will be 50:50.

The activity of the catalyst in a diluent composed of hydrocarbon and chlorinated hydrocarbon or in a chlorinated hydrocarbon diluent is superior to that of the catalyst in a hydrocarbon diluent. The yield of the alternate copolymer is higher than that of the copolymer prepared in a hydrocarbon diluent. Moreover, the glass transition temperature of the alternate copolymer prepared in a mixture of hydrocarbon and chlorinated hydrocarbon or in a chlorinated hydrocarbon diluent is lower than that of the copolymer prepared in a hydrocarbon diluent. It is noteworthy to lower the glass transition temperature of the copolymer.

After the polymerization is complete, the reaction product is separated from the reaction tube and treated to separate the diluent and unreacted monomer. The alternate copolymer is then treated to remove the catalyst residues, which treatment may comprise washing with acidified methanol. The acid which is used to acidify methanol is a mineral acid such as hydrochloric acid. Thereafter the alternate copolymer may be washed with methanol several times and may be dried under vacuum. Very small amounts of butadiene homopolymer, may be involved in the reaction product; this is easily removed by washing it with diethyl ether.

Figure 2:
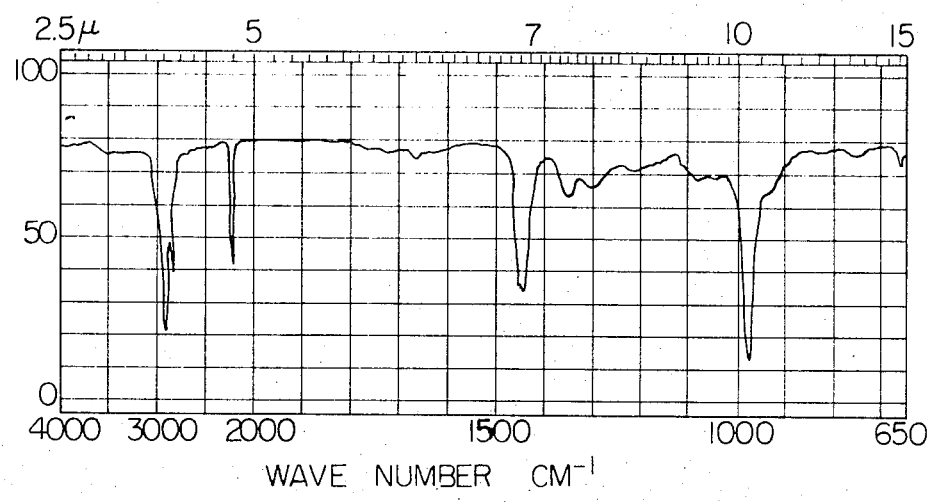

FIG. 1 shows the NMR spectrum of the product; and FIG. 2 shows the IR spectrum of the product.

The following examples illustrate the new alternate copolymer of butadiene and acrylonitrile and the process for preparation thereof in accordance with this invention.

EXAMPLE 1

Employing the usual, dry, air-free technique, 2 milliliters methylene chloride, 10 millimoles vanadium (V) oxychloride, 1 milliliter trithylaluminum solution in toluene (1 molar solution (3.3 milliliters acrylonitrile and 40 milliliters liquid butadiene were put successively in a 25 milliliter glass bottle held in a low temperature bath at −78° C. Thereafter the bottle was sealed and the acrylonitrile and butadiene were allowed to copolymerize at 35° C. for 16 hours. 0.50 g. of rubbery high molecular weight copolymer was obtained. The result of the elementary analysis of the polymer is as follows: N.—calculated value, 13.1% by weight; observed value, 12.8% by weight.

The above mentioned values correspond to those of a 1:1 copolymer of butadiene and acrylonitrile. The alternate structure of the product was confirmed from the NMR data (FIG. 1), which show 7.7τ peak arising from methylene group in a butadiene-acrylonitrile sequence but no 7.9τ peak arising from a butadiene-butadiene sequence. The microstructure of butadiene units was found to be all trans-1.4 configuration from IR analysis (FIG. 2). Its glass transition temperature was observed to be −28° C. and its intrinsic viscosity was 0.5 (dl./g.) in chloroform at 30° C.

EXAMPLE 2

Employing the usual, dry, air-free technique, 1 milliliter methylene chloride, 20 millimoles vanadium (V) oxychloride, 1 milliliter triethylaluminum solution in toluene (1 molar solution), 3.3 milliliters acrylonitrile and 4.0 milliliters liquid butadiene were put successively in a 25 milliliter glass bottle held in a low temperature bath at −78° C. Thereafter the bottle was sealed and the acrylonitrile and butadiene were allowed to copolymerize at 35° C. for 16 hours. 0.10 g. of rubbery high molecular weight copolymer was obtained. From its elementary analysis and NMR spectrum the polymer was determined to be an alternate copolymer of butadiene and acrylonitrile. The microstructure of a butadiene unit in the alternate copolymer was trans-configuration. Its glass transition temperature was observed to be −26° C. and its intrinsic viscosity was 0.5 (dl./g.) in chloroform at 30° C.

EXAMPLES 3–7

In these examples, the usual, dry, air-free technique was employed and varying amounts of diluent, 1 molar vanadium (V) oxychloride solution in methylene chloride and 1 molar triethylaluminum or triisobutylaluminum solution in toluene were put successively into 25 milliliter glass bottles held in a low temperature bath at −78° C. The amounts of diluent and each solution of individual catalyst component are set forth in Table 1 in milliliters. After the addition of the catalyst, 3.3 milliliters acrylonitrile and 4.0 milliliters liquid butadiene were put successively into the bottles, also employing the usual, dry, air-free technique at −78° C. Thereafter these bottles were sealed and the acrylonitrile and butadiene were allowed to copolymerize at the various temperatures listed in Table 1 for 16 hours. From their elementary analyses and NMR spectra the copolymers prepared in these examples were all identified as alternate copolymers of butadiene and acrylonitrile. The microstructure of the butadiene units in these alternate copolymers was all trans-configuration.

TABLE 1

| Example number | Monomers [1] | | Diluent CH₂Cl₂ (ml.) | Catalysts [2] | | Ml. | Reaction conditions | | Copolymer [3] | | |
|---|---|---|---|---|---|---|---|---|---|---|---|
| | AN (ml.) | BD (ml.) | | VOCl₃ soln. (ml.) | AlR₁R₂R₃ soln. | | Temp. (°C.) | Time (hr.) | Yield (g.) | [η] (dl./g.) | T_G (°C.) |
| 3 | 3.3 | 4.0 | 0 | 3 | AlEt₃ | 1 | 35 | 16 | 2.10 | 0.3 | −25 |
| 4 | 3.3 | 4.0 | 1 | 2 | AlEt₃ | 1 | 35 | 16 | 1.96 | 0.3 | −20 |
| 5 | 3.3 | 4.0 | 1 | 2 | AlEt₃ | 1 | −15 | 16 | 1.45 | 0.8 | −17 |
| 6 | 3.3 | 4.0 | 1 | 2 | AliBu₃ | 1 | 35 | 16 | 2.03 | 0.3 | −20 |
| 7 | 3.3 | 4.0 | 0 | 3 | AliBu₃ | 1 | −15 | 16 | 0.68 | | |

[1] AN=Acrylonitrile; BD=Liquid butadiene.
[2] VOCl₃ soln.=1 molar vanadium (V) oxychloride solution in methylene chloride; AlR₁R₂R₃ soln.=1 molar triethylaluminum or triisobutylaluminum solution in toluene.
[3] [η]=Intrinsic viscosity in chloroform at 30° C.; T_G=Glass transition temperature measured by Perkin Elmer Differential Scanning Calorimeter.

EXAMPLES 8–12

In these examples, employing the usual, dry, air-free technique, varying amounts of diluent, 1 molar vanadium (V) oxychloride solution in toluene and 1 molar triethylaluminum or triisobutylaluminum solution in toluene were put successively into 25 milliliters glass bottles held in a low temperature bath at −78° C. The amounts of diluent and of each solution of individual catalyst component are set forth in Table 2 in milliliters. After the addition of catalyst, 3.3 milliliters acrylonitrile and 4.0 milliliters liquid butadiene were put successively into the bottles also employing the usual, dry, air-free technique at −78° C. Thereafter these bottles were sealed and the acrylonitrile and butadiene were allowed to copolymerize at the various temperatures listed in Table 2 for 16 hours. From their elementary analyses and NMR spectra the copolymers prepared in these examples were all determined to be alternate copolymers of butadiene and acrylonitrile. The microstructure of butadiene units in these alternate copolymers was all transconfiguration.

TABLE 2

| Example number | Monomers [1] | | Diluent toluene (ml.) | Catalysts [2] | | Ml. | Reaction conditions | | Copolymer [3] | | |
|---|---|---|---|---|---|---|---|---|---|---|---|
| | AN (ml.) | BD (ml.) | | VOCl₃ soln. (ml.) | AlR₁R₂R₃ soln. | | Temp. (° C.) | Time (hr.) | Yield (g.) | [η] (dl./g.) | T_G (° C.) |
| 8 | 3.3 | 4.0 | 1 | 2 | AlEt₃ | 1 | 35 | 16 | 1.70 | 0.3 | −14 |
| 9 | 3.3 | 4.0 | 1 | 2 | AlEt₃ | 1 | −15 | 16 | 1.32 | 0.5 | −16 |
| 10 | 3.3 | 4.0 | 0 | 3 | AlEt₃ | 1 | −15 | 16 | 1.37 | | −17 |
| 11 | 3.3 | 4.0 | 1 | 2 | AliBu₃ | 1 | 35 | 16 | 0.23 | | |
| 12 | 3.3 | 4.0 | 0 | 3 | AliBu₃ | 1 | −15 | 16 | 0.58 | 0.5 | |

[1] AN=Acrylonitrile; BD=Liquid butadiene.
[2] VOCl₃ soln.=1 molar vanadium (V) oxychloride solution in toluene; AlR₁R₂R₃ soln.=1 molar triethylaluminum or triisobutylaluminum solution in toluene.
[3] [η]=Intrinsic viscosity in chloroform at 30° C.; T_G=Glass transition temperature measured by Perkin Elmer Differential Scanning Calorimeter.

EXAMPLES 13-15

In these examples employing the usual, dry, air-free technique varying amounts of diluent, 0.63 molar vanadium (V) oxychloride solution in toluene and 1 molar triethylaluminum solution in toluene were put successively into 25 milliliter glass bottles held in a low temperature bath at −78° C. The amounts of diluent and each solution of individual catalyst component are set forth in Table 3 in milliliters. After the addition of the catalyst, 3.3 milliliters acrylonitrile and 4.0 milliliters liquid butadiene were put successively into the bottles also employing the usual, dry, air-free technique at −78° C. Thereafter these bottles were sealed and the acrylonitrile and butadiene were allowed to copolymerize at the various temperatures listed in Table 3 for 20 hours. From their elementary analyses and NMR spectra, the copolymers prepared in these examples were all identified to be alternate copolymers of butadiene and acrylonitrile. The microstructure of butadiene units in these alternate copolymers were all transconfiguration.

TABLE 3

| Example number | Monomers [1] | | Diluent toluene (ml.) | Catalysts [2] | | Reaction conditions | | Copolymer [3] | |
|---|---|---|---|---|---|---|---|---|---|
| | AN (ml.) | BD (ml.) | | VOCl₃ soln. (ml.) | AlEt₃ soln. (ml.) | Temp. (° C.) | Time (hr.) | Yield (g.) | [η] (dl./g.) |
| 13 | 3.3 | 4.0 | 2 | 1.5 | 0.5 | 25 | 20 | 1.12 | 0.4 |
| 14 | 3.3 | 4.0 | 2 | 1.5 | 0.5 | −30 | 20 | 0.39 | 0.8 |
| 15 | 3.3 | 4.0 | 2 | 2.5 | 0.5 | −30 | 20 | 0.24 | 0.7 |

[1] AN=Acrylonitrile; BD=Liquid butadiene.
[2] VOCl₃ soln.=0.63 molar vanadium (V) oxychloride solution in toluene; AlEt₃ soln.=1 molar triethyl-aluminum solution in toluene.
[3] [η]=Intrinsic viscosity in chloroform at 30° C.

EXAMPLE 16

Employing the usual, dry, air-free technique 1 milliliter tetrachloroethylene, 2 milliliters vanadium (V) oxychloride solution in tetrachloroethylene (1 molar solution), 1 milliliter triethylaluminum solution in toluene (1 molar solution), 3.3 milliliters acrylonitrile, and 4.0 milliliters liquid butadiene were put successively into a 25 milliliter glass bottle held in a low temperature bath at −78° C. Thereafter the bottle was sealed and the acrylonitrile and butadiene were allowed to copolymerize at 35° C. for 16 hours. 1.72 g. of rubbery copolymer was obtained. From elementary analysis and NMR spectrum it was identified to be an alternate copolymer of butadiene and acrylonitrile. The microstructure of butadiene units in the alternate copolymer was all trans-configuration. Its glass transition temperature was observed to be −22° C.

EXAMPLES 17-19

In these examples employing the usual, dry, air-free technique varying amounts of diluent and 1 molar chromium (VI) oxychloride solution in methylene chloride were put successively into 25 milliliter glass bottles at 25° C. Thereafter the bottles were held in a low temperature bath at −78° C. and varying amounts of 1 molar triethylaluminum or triisobutylaluminum solution in toluene, 3.3 milliliters acrylonitrile and 4.0 milliliters liquid butadiene were put successively into the bottles, by employing the usual, dry, air-free technique at −78° C. The amount of diluent and each solution of individual catalyst component are set forth in Table 4 in milliliters. Thereafter the bottles were sealed and the acrylonitrile and butadiene were allowed to copolymerize at 35° C. for 16 hours. From their elementary analyses and NMR spectra the copolymers prepared in these examples were all identified to be alternate copolymers of butadiene and acrylonitrile. The microstructure of the butadiene units in these alternate copolymers was all trans-configuration.

TABLE 4

| Example number | Monomers [1] | | Diluent CH₂Cl₂ (ml.) | Catalysts [2] | | Ml. | Reaction conditions | | Copolymer [3] | | |
|---|---|---|---|---|---|---|---|---|---|---|---|
| | AN (ml.) | BD (ml.) | | CrO₂Cl₂ soln. (ml.) | AlR₁R₂R₃ soln. | | Temp. (° C.) | Time (hr.) | Yield (g.) | [η] (dl./g.) | T_G (° C.) |
| 17 | 3.3 | 4.0 | 2 | 1 | AlEt₃ | 1 | 35 | 16 | 0.41 | 0.2 | −27 |
| 18 | 3.3 | 4.0 | 1 | 2 | AlEt₃ | 1 | 35 | 16 | 0.99 | 0.6 | |
| 19 | 3.3 | 4.0 | 1 | 2 | AliBu₃ | 1 | 35 | 16 | 0.89 | 0.5 | |

[1] AN=Acrylonitrile; BD=Liquid butadiene.
[2] CrO₂Cl₂ soln.=1 molar chromium (VI) oxychloride solution in methylene chloride; AlR₁R₂R₃ soln.=1 molar triethylaluminum or triisobutylaluminum solution in toluene.
[3] [η]=Intrinsic viscosity in chloroform at 30° C; T_G=Glass transition temperature measured by Perkin Elmer Differential Scanning Calorimeter.

EXAMPLES 20-24

In these examples employing the usual, dry, air-free technique varying amounts of diluent and 1 molar chromium (VI) oxychloride solution in n-heptane were put successively into 25 milliliter bottles at 25° C. Thereafter the bottles were held in a low temperature bath at −78° C. and varying amounts of 1 molar triethylaluminum or triisobutylaluminum solution in toluene, 3.3 milliliters acrylonitrile and 4.0 milliliters liquid butadiene were put successively into the bottles also employing the usual, dry, air-free technique at −78° C. The amounts of diluent and each solution of individual catalyst component are set forth in Table 5 in milliliters. Thereafter these bottles were sealed and the acrylonitrile and butadiene were allowed to copolymerize at the various temperatures listed in Table 5 for 16 hours. From their elementary analyses and NMR spectra the copolymers prepared in these examples were all identified to be alternate copolymers of butadiene and acrylonitrile. The microstructure of the butadiene units in these alternate copolymers was all trans-configuration.

TABLE 5

| Example number | Monomers[1] | | Diluent n-heptane (ml.) | Catalysts[2] | | Ml. | Reaction conditions | | Copolymer[3] | |
|---|---|---|---|---|---|---|---|---|---|---|
| | AN (ml.) | BD (ml.) | | $CrO_2Cl_2$ soln. (ml.) | $AlR_1R_2R_3$ soln. | | Temp. (°C.) | Time (hr.) | Yield (g.) | $[\eta]$ (dl./g.) |
| 20 | 3.3 | 4.0 | 2 | 1 | $AlEt_3$ | 1 | 35 | 16 | 0.25 | |
| 21 | 3.3 | 4.0 | 1 | 2 | $AlEt_3$ | 1 | 35 | 16 | 0.35 | |
| 22 | 3.3 | 4.0 | 1 | 2 | $AliBu_3$ | 1 | 35 | 16 | 0.50 | |
| 23 | 3.3 | 4.0 | 0 | 3 | $AlEt_3$ | 1 | 35 | 16 | 0.69 | |
| 24 | 3.3 | 4.0 | 4 | 1 | $AlEt_3$ | 1 | −30 | 20 | 0.10 | 0.3 |

[1] AN=Acrylonitrile; BD=Liquid butadiene.
[2] $CrO_2Cl_2$ soln.=1 molar chromium (VI) oxychloride solution in n-heptane; $AlR_1R_2R_3$ soln.=1 molar triethylaluminum or triisobutylaluminum solution in toluene.
[3] $[\eta]$=Intrinsic viscosity in chloroform at 30° C.

EXAMPLE 25

Employing the usual, dry, air-free technique 2 milliliters n-heptane and 10 millimoles chromium (VI) oxychloride were put successively into a 25 milliliter glass bottle at 25° C. Thereafter the bottle was held in a low temperature bath at −78° C. and 1 milliliter triethylaluminum solution in toluene (1 molar solution), 3.3 milliliters acrylonitrile and 4.0 milliliters liquid butadiene were put successively into the bottle also employing the usual, dry, air-free technique at −78° C. Then the bottle was sealed and the acrylonitrile and butadiene were allowed to copolymerize at 35° C. for 16 hours. 0.38 g. rubbery alternate copolymer of butadiene and acrylonitrile was obtained.

EXAMPLE 26

Employing the usual dry air-free technique 2 milliliters vanadium (V) oxychloride solution in toluene (1 molar solution), 1 milliliter triethylaluminum solution in toluene (1 molar solution), 2.6 g. acrylonitrile and 3.5 g. $C_4$-fraction containing 1.4 g. butadiene ($C_4$-fraction composition: butadiene; 39.7, isobutylene; 30.2, butene-1; 13.7, trans-butene-2; 6.2, cis-butene-2; 4.7, butane; 5.0, propylene; 0.2 wt. percent) were put successively into a 25 milliliter glass bottle held in a low temperature bath at −78° C. Thereafter the bottle was sealed and the acrylonitrile and butadiene were allowed to polymerize at 35° C. for 20 hours. 1.30 g. acetone and chloroform soluble alternate copolymer of butadiene and acrylonitrile was obtained. Its intrinsic viscosity was 0.3 (dl./g.) in chloroform at 30° C. and its glass transition temperature was observed to be −15° C.

What is claimed is:

1. A bulk or solution polymerization process for preparing a 1:1 alternate copolymer of butadiene and acrylonitrile having alternating butadiene and acrylonitrile units, all butadiene units being of trans configuration and having a sole 7.71τ peak (NMR) ascribed to the methylene unit of the butadiene unit, by contacting a mixture of butadiene and acrylonitrile in liquid phase in the substantial absence of moisture at a temperature of from about −78° C. to about +40° C. with a catalyst system formed by mixing a metal oxychloride selected from the group consisting of vanadium (V) oxychloride and chromium (VI) oxychloride with a trialkylaluminum compound.

2. A process of claim 1 wherein the molar ratio of trialkylaluminum compound to said metal oxychloride is lower than 1.5.

3. A process of claim 1 wherein the copolymerization reaction is carried out in the form of solution polymerization with a diluent selected from the group consisting of a hydrocarbon, a chlorinated hydrocarbon and a mixture thereof.

4. A process of claim 1 wherein the molar ratio of butadiene to acrylonitrile in the initial monomer composition is within the range from 20:80 to 80:20.

5. A process of claim 1 wherein the trialkylaluminum compound is defined by the formula $AlR_1R_2R_3$ wherein $R_1$, $R_2$ and $R_3$ are alkylradicals having from 1 to 12 carbon atoms.

6. A process of claim 1 wherein said metal oxychloride is mixed with a trialkylaluminum compound in the presence of a diluent selected from the group consisting of a hydrocarbon, a chlorinated hydrocarbon and a mixture thereof.

7. A process of claim 3 wherein said trialkylaluminum compound is defined by the formula $AlR_1R_2R_3$ in which $R_1$, $R_2$ and $R_3$ are alkyl radicals having from 1 to 12 carbon atoms, the molar ratio of trialkylaluminum compound to said metal oxychloride is lower than 1.5, and the molar ratio of butadiene to acrylonitrile in the initial monomer composition is within a range of from 20:80 to 80:20.

8. A process of claim 7 wherein $R_1$, $R_2$ and $R_3$ are either ethyl or i-butyl.

9. A process of claim 8 wherein said metal oxychloride is mixed with said trialkylaluminum compound in the presence of a diluent selected from the group consisting of a hydrocarbon, a chlorinated hydrocarbon and a mixture thereof.

References Cited

UNITED STATES PATENTS 3,278,503   10/1966   Serniuk _____ 260—82.5

FOREIGN PATENTS 1,487,211   5/1967   France _____ 260—82.5

OTHER REFERENCES

Symposium of Japanese Chemical Fiber Institute, October 1968, No. 26, pp. 83–96, Furakawa et al.

"Properties of Acrylonitrile-Butadiene Alternate Copolymers," paper presented at 17th Annual Meeting of Polymers, Japan, May 1968, p. 423, Furakawa et al.

Journal of Polymer Science, vol. B–5, pp. 47–55 (1967), "Complex Copolymerization," Hirooka et al.

JOSEPH L. SCHOFER, Primary Examiner
W. F. HAMROCK, Assistant Examiner

U.S. Cl. X.R.
260—82.5.